United States Patent [19]

Kurosaki

[11] 4,030,721
[45] June 21, 1977

[54] AUTOMATIC MANUSCRIPT DISCHARGING DEVICE FOR COPYING MACHINES

[75] Inventor: Takefumi Kurosaki, Isehara, Japan

[73] Assignee: Rank Xerox Ltd., London, England

[22] Filed: July 27, 1976

[21] Appl. No.: 709,155

[52] U.S. Cl. .................................. 271/3; 271/82; 271/277
[51] Int. Cl.² ........................................ B65H 29/06
[58] Field of Search ............ 271/264, 277, 82, 204, 271/206, 3

[56] References Cited

UNITED STATES PATENTS

| 3,790,159 | 2/1974 | Hatzmann | 271/277 X |
| 3,901,594 | 8/1975 | Robertson | 271/3 X |

Primary Examiner—Richard A. Schacher

[57] ABSTRACT

An automatic document ejector for use with a copying machine wherein the document is automatically gripped along its lead edge as the platen cover is closed, the gripper being adapted to pull the document from the platen for ejection into a document receiving tray as the platen cover is lifted following completion of the copying cycle.

2 Claims, 3 Drawing Figures

AUTOMATIC MANUSCRIPT DISCHARGING DEVICE FOR COPYING MACHINES

BACKGROUND OF THE INVENTION

This invention relates to an automatic manuscript discharging device for copying machines wherein a manuscript or original is placed on a plate such as glass plates etc., which are usually referrred to as platen glasses, the manuscript is optically scanned produce an electrostatic latent image on a photoelectric element, and then the electrostatic latent image is developed, thereby obtaining a reproduction of the manuscript.

In such types of conventional copying machines, it has been a common practice for the operator to open the cover for the manuscript resting plate, place a manuscript on the plate and then close the cover for permitting the machine to start scanning of the manuscript.

Such conventional copying machines are disadvantageous in that when a great many manuscripts are required to be reproduced, it is necessary for the operator to grip the cover handle by his one hand and discharge the manuscript and insert a succeeding manuscript by his other hand, and these time consuming operations have to be made by him repeatedly and continuously.

Further, copying machines having improved efficiency and performance have become available which can reproduce even 3,600 to 7,000 sheets of copying papers per hour, and so if discharging and insertion of manuscripts are effected manually by the operator, the improved efficiency or performance of the copying machines cannot be fully utilized.

With a view to eliminating such disadvantages, a number of automatic manuscript discharging devices have been proposed and put into practical use, however, they are of a large scale and also expensive in cost.

The present invention has been made in the light of the above-mentioned circumstances, and has for its object to provide automatic manuscript discharging devices for copying machines which are of a small scale and also inexpensive in cost.

SUMMARY OF THE INVENTION

An automatic manuscript discharging device for copying machines, characterized by a pivotally movable cover overlying the platen glass on which a manuscript to be copied is placed, a rotatable manuscript discharging roller being provided with a gripper for gripping the manuscript placed on the platen, a roller located opposite to and cooperating with the manuscript discharging roller to discharge the manuscript after exposure of the manuscript, a driving mechanism for rotating the manuscript discharging roller through a predetermined angle, a mechanism adapted to locate the open gripper at a predetermined position and locate the closed gripper when the manuscript is placed on the platen and scanning is commenced or completed, and a stopper adapted to stop the manuscript discharging roller at a predetermined position when it has rotated through a predetermined angle of rotation.

DESCRIPTION OF THE PREFERRED EMBODIMENT

Figure 1:
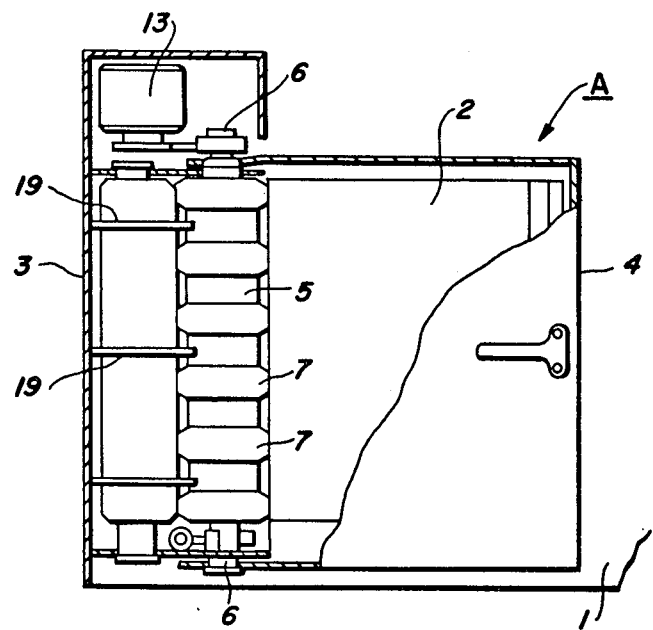
FIG. 1 is a plan view of one embodiment of the present invention shown in partly broken state.
Figure 2:
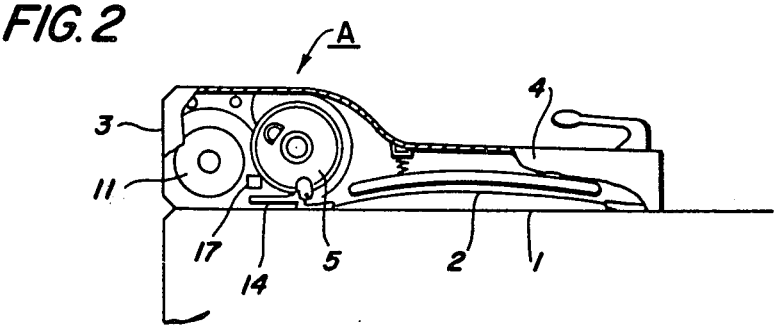
FIG. 2 is a side elevational view of the embodiment of FIG. 1 in partially broken state.

Mounted on a copying machine body 1 is a plate 2 on which a manuscript is placed. An automatic manuscript discharging device A in accordance with the present invention is located to cover the plate 2.

Stated in brief, the automatic manuscript discharging device comprises a box shaped fixed part 3 and a movable part 4 for covering the plate 2. A manuscript discharging roller 5 is rotatably mounted relative to the fixed part 3. The movable part 4 is rotatably mounted relative to support shafts 6 of the manuscript discharging roller 5.

The manuscript discharging roller 5 is located approximately parallel with manuscript positioning edges of the plate 2 on which a manuscript is placed. Further, the manuscript discharging roller 5 may be of any desired type, however, the roller is preferably attached with a plurality of rubber tires so as to form a plurality of annular projections 7 at equally spaced intervals on its outer peripheral surface. It is also functionally desirable to engage a gripper 8 to be mentioned hereinafter with the annular projections 7.

The above-mentioned gripper 8 is privotally mounted through a shaft 9 relative to the manuscript discharging roller 5 and is usually energized to close (under gripped condition). Further, mounted on the shaft 9 is a gripper driving cam 10 (which also serves as a roller stopper).

Reference numeral 11 denotes a roller located opposite the manuscript discharging roller 5 which is rotatably carried by a support shaft 12 relative to the fixed part 3. The roller 11 is arranged to rotate in contact with the annular projections 7 of the manuscript discharging roller 5.

The above-mentioned support shaft 6 of the manuscript discharging roller 5 is adapted to be driven by means of a driving mechanism 13 which comprises in combination an electric motor and a controller of a type that power supply to the electric motor is cut off by a cam means or by the action of a pulse signal when the motor or the shaft is rotated through a predetermined angle of rotation. The arrangement is made such that when the motor has rotated through a predetermined angle, the electric current flow therethrough is cut off so that the manuscript discharging roller 5 is stopped at a predetermined position by the action of a stopper 14 to be mentioned later.

The operation of the automatic mmanuscript discharging device of the present invention as well as the details of the components will be described hereinbelow.

Figure 3:
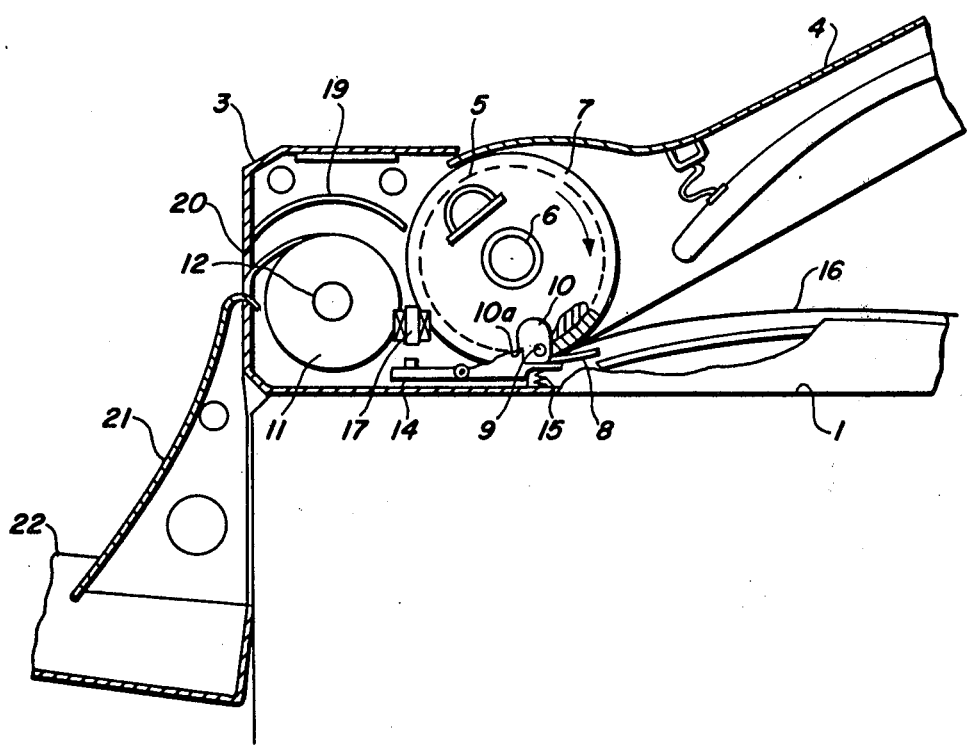
FIG. 3 is an enlarged view of the principal parts of the device of the present invention.

FIG. 3 shown the condition of the device in which the movable part 4 is opened through a suitable angle by the operator, the manuscript discharging roller 5 is stopped, and the gripper 8 is located to open (or under non-gripping condition) against the biasing force by the gripper driving cam 10 (serving also as roller stopper). Under such condition, the drum stopper 14 is engaged with a stepped part 10a of the gripper driving cam 10 (serving also as roller stopper), thereby stopping the drum at a suitable position and keeping the gripper 8 open.

In this condition, the manuscript 16 inserted manually by the operator between the gripper 8 and the annular projections 7 and then the movable part 4 is shut. Immediately before the movable part 4 is completely shut, a suitable switch (not shown) acts to energize an electromagnet 17 which, when energized, attracts and rotates the stopper 14, thereby disengaging the latter from the stepped part 10a of the gripper driving cam 10 (serving also as roller stopper) to render the manuscript discharging roller 5 rotatable and permitting the gripper 8 to grip the manuscript 16.

Further, the arrangement may be made such that the electromagnet 17 is energized when the movable part 4 is opened by the operator after the completion of scanning.

Upon completion of scanning, the movable part 4 is opened by the machine operator. At that time, when the movable part 4 is slightly opened, the driving mechanism 13 is energized by a switch not shown in the drawing. Then, the manuscript discharging roller 5 is rotated in the direction as indicated by the arrow, and the cooperating roller 11 located opposite thereto is also rotated by frictional engagement with roller 5.

When the gripper 8 has passed through the contact point of the rollers 5 and 11, the gripper driving cam 10 (which serves also as roller stopper) will engage with a cam follower (not shown) attached to the fixed part 3 so that the gripper 8 is rotated into non-gripping condition. In consequence, the manuscript 16 is moved away from the manuscript discharging roller 5 and sent out by the rollers 5 and 11. Then, the manuscript 16 is directed by a guide plate 19 mounted in the fixed part 3 through an outlet 20 outside the copying machine. The manuscript 16 is further guided by a guide 21 so as to be piled on a manuscript tray 22.

The manuscript discharging roller 5 is arranged to be rotated through an angle of rotation sufficient to completely send out the longitudinal length of the manuscript or original 16. To this end, the control for the roller 5 may employ a pulse generator and associated counter, mechanical cams etc.

Further, the arrangement is made such upon rotation of the manuscript discharging roller 5 through a predetermined angle, the driving meachanism 13 is stopped and the electromagnet 17 is deenergized. As a result, the manuscript discharging roller 5 will rotate inertia, and the gripper driving cam 10 (serving also as roller stopper) is brought into contact with the stopper 14 thereby stopping the roller 5. At the same time, the gripper is put under non-gripping condition and is ready for the inserting of a subsequent manuscript.

Since the present invention is constructed as mentioned hereinabove, it is necessary for the operator only to open and shut the movable part 4 by his one hand and place manuscritps 16 in turn on the plate 2 by his other hand in order to achieve continuous copying operation.

Therefore, operator involvement can be extremely simplified, the efficiency of copying operation can be improved, and also the improved efficiency of high-speed copying machines can be fully utilized.

Further, the whole device can be manufactured in a compact size and the cost thereof can be reduced considerably.

Still further, since the movable part 4 is adapted to expose and cover the plate 2 on which a manuscript 16 is placed, when the gripper 8 cannot grip the manuscript 16, the operator can remove the latter so that it is not necessary for the operator to stop the copying machine when repairing the parts out of order, and thick manuscripts such as books can be reproduced while the movable part 4 is open.

While the invention has been described with reference to the structure disclosed, it is not confined to the details set forth, but is intended to cover such modifications or changes as may come within the scope of the following claims.

What is claimed is:

1. An automatic document ejection device adapted for incorporation in a platen cover of a copying machine having a platen glass for placement of documents to be exposed by the copying machine comprising:
   a pivotal cover overlying the platen glass;
   a rotatable, document discharging roller having a gripper for gripping the lead edge of a document placed on the platen glass
   a drive mechanism for rotating said discharging roller through a predetermined angle
   means for closing said gripper as said pivotal cover is closed; and for opening said gripper when said discharging roller is rotated through the predetermined angle said drive mechanism being activated as said pivotal cover is lifted to discharge the gripped document.

2. An automatic document ejecting device according to claim 1 further including a second roller adapted for cooperation with said discharging roller to transport the document being discharged following the opening of said gripper.

* * * * *